United States Patent
Ishida et al.

[11] Patent Number: 6,029,047
[45] Date of Patent: Feb. 22, 2000

[54] CABLE TELEPHONY TERMINAL DEVICE HAVING A CALL LINE SELECTOR

[75] Inventors: Hiroyuki Ishida, Fujisawa; Yoshio Sato, Hiratsuka; Masanori Yanase, Fukaya; Kaneo Sugiura, Yokohama, all of Japan

[73] Assignees: The Furukawa Electric Co., Ltd.; Japan Telecom Co., Ltd., both of Tokyo, Japan

[21] Appl. No.: 08/969,915

[22] Filed: Nov. 13, 1997

[30] Foreign Application Priority Data

Nov. 18, 1996 [JP] Japan ................... 8-306531

[51] Int. Cl.[7] .............. H04H 1/02; H04N 7/10; H04M 11/00
[52] U.S. Cl. ............... 455/6.2; 348/10; 455/6.3; 379/93.07; 379/93.09
[58] Field of Search ................ 348/6, 10, 12, 348/13; 455/3.1, 4.1, 4.2, 5.1, 6.1, 6.2, 6.3; 379/90.01, 93.01, 93.05, 93.06, 93.07, 93.09

[56] References Cited

U.S. PATENT DOCUMENTS 5,027,426  6/1991  Chiocca, Jr. .
5,563,938  10/1996  Soshea et al. .
5,774,527  6/1998  Handelman et al. ............ 348/10 X

*Primary Examiner*—John W. Miller
*Attorney, Agent, or Firm*—Frishauf, Holtz, Goodman, Langer & Chick, P.C.

[57] ABSTRACT

A call line selector of a cable telephony terminal device is connected to one telephone and this telephone is commonly used by two telephone systems. The call line selector automatically selects an optimum line from CATV and PSTN lines in correspondence with a dial number input from the telephone at the calling time, thereby connecting the selected line and the telephone and thereby enabling a user to have a telephone conversation. Also, at the receiving time, the call line selector detects a reception (incoming call) signal and, in correspondence with the detected result, connects the cable telephony line or PSTN line and the telephone and rings the bell of the telephone to notify the user of the reception of the incoming call signal.

7 Claims, 6 Drawing Sheets

CABLE TELEPHONY TERMINAL DEVICE HAVING A CALL LINE SELECTOR

BACKGROUND OF THE INVENTION

1. Field of the Invention

The present invention relates to a cable telephony terminal equipment (i.e., device) that concurrently uses a telephone line directed toward a cable television network and a telephone line directed toward a public switched telephone network (hereinafter referred to also as "a PSTN").

2. Description of the Related Art

In recent years, as telecommunications and broadcasting have become more integrated, the CATV (cable television) enterprise has also progressed from a conventional stage that mainly comprised broadcasting services of distributing images or the like to a new stage that also comprises telecommunication services. Particularly, the current status is that the construction of a so-called "cable telephony system" of utilizing the cable television network as a telephone subscriber's network has proceeded as means for a second telephone service in addition to the first telephone service that stands on the use of the PSTN network.

In this cable telephony system, the line branched from the telephone line for the cable television network (hereinafter referred to as "the cable telephony line") (for example, a coaxial cable or optical fiber) is installed within each subscriber home in addition to the conventionally installed telephone line for the public switched telephone network (hereinafter referred to as "the PSTN line"). For this reason, telephones that are connected to the PSTN line and the cable telephony line respectively are both installed within the subscriber home.

In this CATV telephone, the subscribers that belong to the same cable television network can have a telephone conversation through the use of the cable television network. Also, by connecting this cable television network to the public switched telephone network in charge of a first-class telecommunication enterpriser (regulated by Japan Telecommunication Enterprise Law), the CATV telephone can communicate with a subscriber of the public switched telephone network (PSTN) or an international network.

However, the above-mentioned CATV telephone system has the problem that because the PSTN telephone and the cable telephony are individually separately installed within the subscriber home, at the time of incoming call (reception) the user must make his judgement of which telephone the incoming call is on and so this judgement becomes complex.

Also, when using the telephone, a general user in many cases makes the line selection according to the use charges. However, in a case where the two telephone systems (one for the PSTN and the other for the cable television network) are used, because the charge systems therefor are complex, there is the problem that the selecting criterion is difficult for the user to understand and therefore the user becomes annoyed with his judgement of which telephone he should use each time he makes his telephone call.

SUMMARY OF THE INVENTION

The present invention has been achieved with the above-described points in view and it is an object of the present invention to provide a cable telephony terminal device that enables a single telephone to be commonly used by two telephone systems and eliminates the necessity of selecting which telephone to use at the time of an incoming call.

Further, it is another object of the present invention to provide a cable telephony terminal device that enables automatic selection of the line used at the time of calling.

The above objects can be attained by the cable telephony terminal device of the present invention. In the cable telephony terminal device of the present invention, a coaxial connector is connected to a line for a cable television network and a modular connector is connected to a line for a PSTN, whereby there is extracted a telephone data item having a prescribed frequency band of the data communicated between the cable telephony terminal device and the cable television network by way of a cable telephony terminal modem. A call line selector has a table for call line selection in which there are stored data on selecting signals consisting of dial numbers that specify subscribers of the cable television network or PSTN and data on the cable television network or PSTN to be connected in correspondence with the data on the selecting signal, and detects an incoming call (reception) signal from each of the respective networks. Also, the call line selector is connected to a telephone, and, in correspondence with the selecting signal input from the telephone, connects one of the connectors and the telephone, and, in correspondence with the detected result of the incoming call signal, connects one of the connectors and the telephone.

That is, at the calling time, by the user's dialing an opponent subscriber's telephone number from his single telephone, a specified selecting signal is sent to the call line selector. The call line selector automatically selects an optimum line of the cable television network and PSTN from this selecting signal to thereby enable a telephone conversation to be had with the opponent subscriber. Also, at the receiving time, the call line selector automatically detects from which one of the networks an incoming call signal has come on, thereby selecting the corresponding network automatically. And, the call line selector rings the bell of the telephone to thereby enable a telephone conversation to be had with the opponent subscriber.

Further, the cable telephony terminal device is preferably equipped with a status watch circuit and network power watch circuit for watching the statuses of use of the cable television network and PSTN and an LCR (Least Cost Routing) circuit which stores use charges for a plurality of the networks in correspondence with the data on the selecting signals and which, for example, selects the network whose use charge is the lowest of the use charges for the respective networks that correspond to an input selecting signal and adds to the selecting signal the data on the identification number of the thus-selected network. In a case where one of the cable telephony line and PSTN line cannot be used according to the watched result from the status watch circuit connected to the cable telephony line and that from the network power watch circuit connected to the PSTN line, the call line selector circuit automatically and forcedly connects the other line to the telephone and thereby automatically sends to the other line the selecting signal having added thereto the identification number that identifies the communication line network selected by the LCR circuit.

Further, the call line selector circuit is preferably equipped with a memory portion in which the use charges for the cable television network and PSTN are stored in correspondence with the data on the selecting signals. This call line selector circuit selects from the memory portion the network whose use charge is the lowest of all use charges for the respective networks that correspond to the input selecting signals, and connects the thus-selected network and the telephone automatically.

BRIEF DESCTIPTION OF THE DRAWINGS

DESCRIPTION OF THE PREFERRED EMBODIMENTS

A cable telephony terminal equipment (i.e., device) according to the present invention will now be explained with reference to FIGS. 1 through 6.

Figure 1:
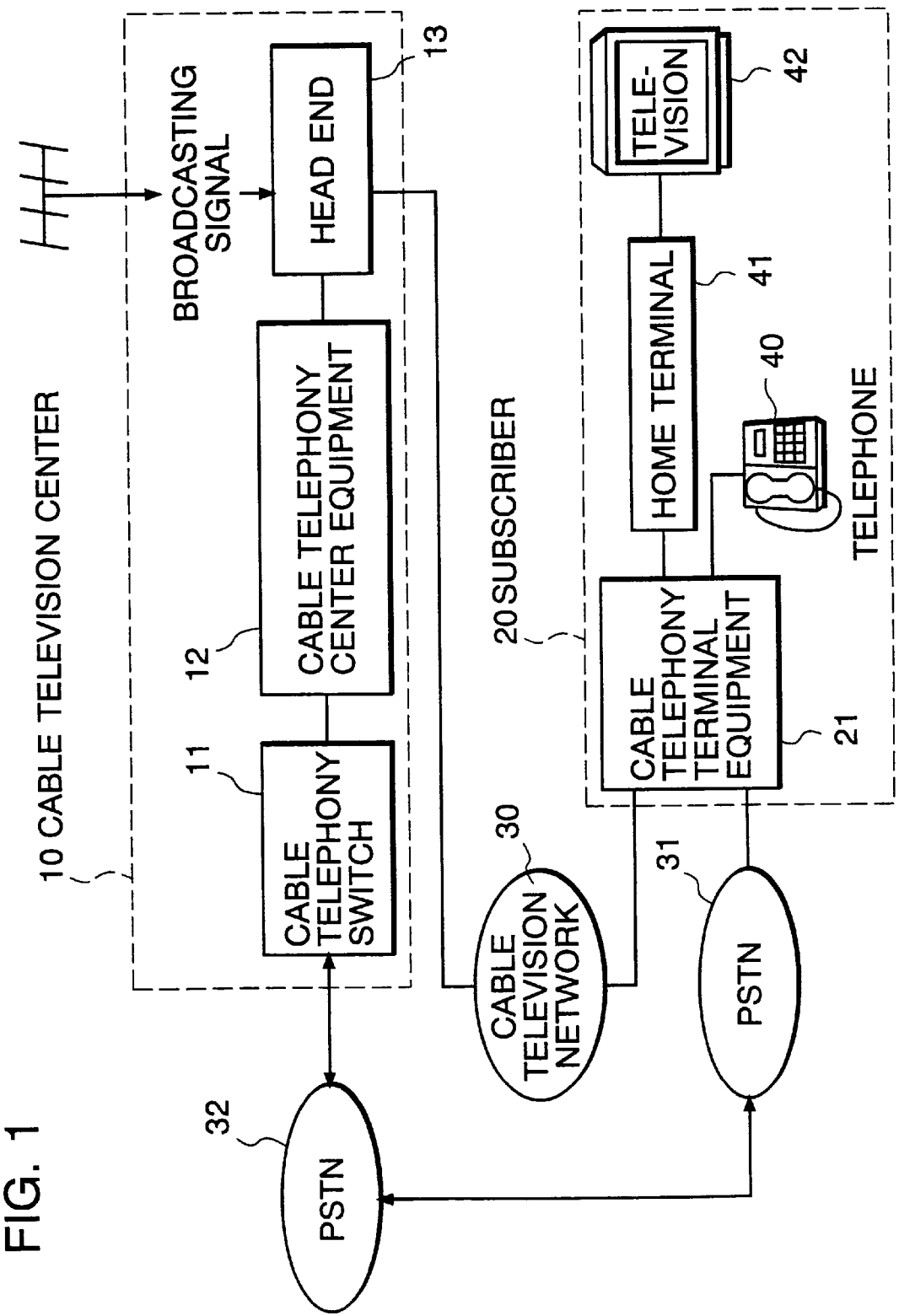
FIG. 1 is a system construction view illustrating an example of a telephone system which uses a cable telephony terminal equipment (i.e., device) according to the present invention.

FIG. 1 is a system construction view illustrating an example of a telephone system which uses a cable telephony terminal equipment according to the present invention.

Referring to FIG. 1, a CATV center 10 and a cable telephony terminal equipment 21 installed within a subscriber's home 20 are connected to each other via a cable television network 30 as well as via a PSTN (Public Switched Telephone Network) 31 in charge of a first-class telecommunication enterpriser 1, a PSTN (Public Switched Telephone Network) 32 in charge of another first-class telecommunication enterpriser 2, or the like.

In the CATV center 10, a telephone signal received by a cable telephony switch 11 is converted to a signal having a high frequency band (RF) in a cable telephony center equipment 12 and then is input to a head end 13. The head end 13 receives not only ground broadcasting signals but also CATV broadcasting signals from a broadcasting satellite, communication satellite and the like and converts these broadcasting signals to RF signals and thereafter composes these RF broadcasting wave signals and the RF telephone signal sent from the center equipment 12. It is to be noted that this telephone signal is composed of, for example, an audio signal and video signal having a prescribed frequency band.

The thus-composed signal is transmitted to the cable telephony terminal equipment 21 by way of a cable television network 30. In this CATV telephone equipment 21, this signal is distributed to two routes, one of which is transmitted to a telephone 40 to thereby enable telephone conversation. Also, the other signal is transmitted to a television 42 after being received by a home terminal 41, whereby display of an image and the like becomes possible by this television 42.

Figure 2:
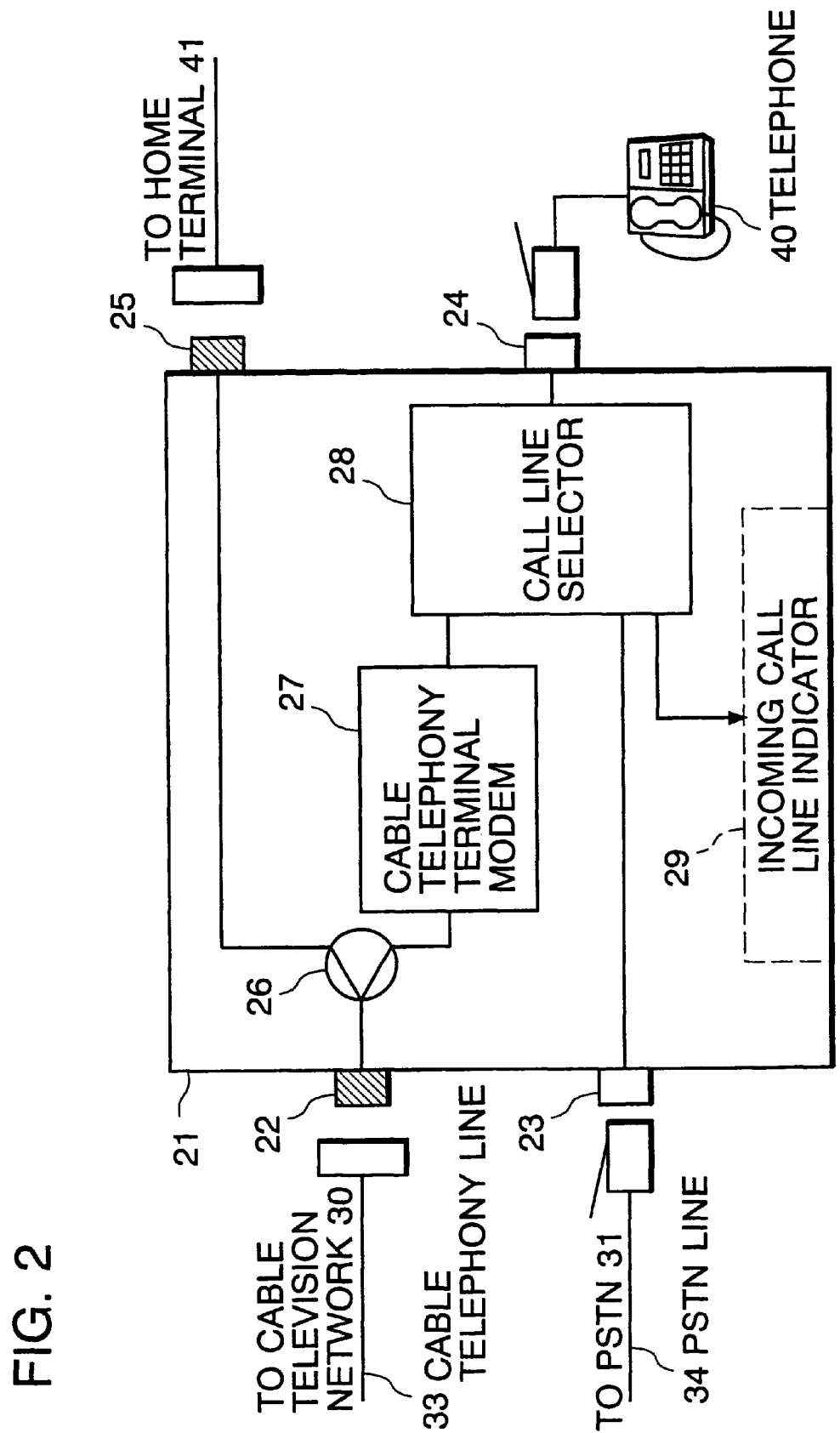
FIG. 2 is a block diagram illustrating a first embodiment of the construction of the cable telephony terminal equipment illustrated in FIG. 1.

FIG. 2 is a block diagram illustrating a first embodiment of the construction of the cable telephony terminal equipment illustrated in FIG. 1.

Referring to FIG. 2, the cable telephony terminal equipment 21 of this embodiment comprises a connector 22 which is a first connector according to the present invention and is connected to a cable television network 30 via a cable telephony line 33 such as a coaxial cable, optical fiber or the like, a modular connector 23 which is a second connector according to the present invention and is connected to the PSTN 31 via a PSTN line 34, a modular connector 24 which is connected to the telephone 40 and a connector 25 which is a third connector according to the present invention and is connected to the home terminal 41.

The signal from the cable television network 30 is distributed to two routes by a splitter 26 connected to the connector 22 and constituting a distributing unit according to the present invention. One signal thereof is output to the home terminal 41 from the connector 25. The other signal is input to a cable telephony terminal modem 27 constituting an extracting unit according to the present invention, where only a telephone signal having a prescribed frequency band is extracted and is output to a call line selector 28.

Figure 3:
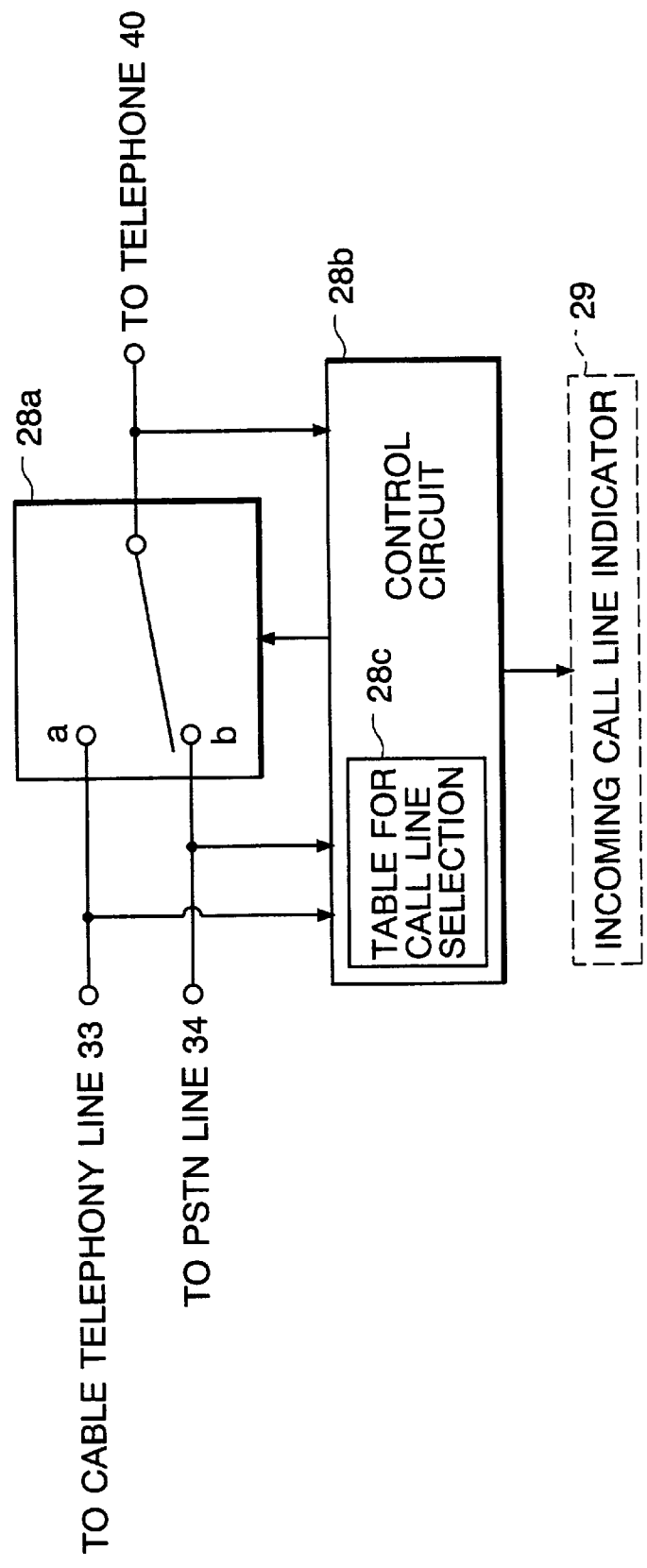
FIG. 3 is a block diagram illustrating an example of the construction of a call line selector illustrated in FIG. 2.

The call line selector 28, as illustrated in FIG. 3, comprises a changeover switch 28a which selects the cable telephony line 33 or PSTN line 34 and connects this selected line and the telephone 40, a control circuit 28b which is connected to the cable telephony line 33, PSTN line 34 and telephone 40, and a table for call line selection 28c provided within the control circuit 28b.

The control circuit 28b is a detecting portion according to the present invention and has a function to detect a reception (incoming call) signal from the line 33 or 34 side. When having detected this reception signal from any one of the lines 33 and 34, the control circuit 28b controls the operation of the changeover switch 28a and connects the line from which the reception signal has come on and the telephone 40 and also rings the bell of the telephone 40.

It is to be noted that if necessary, it is possible to provide, for example, an incoming call line indicator 29 having a displaying function within the cable telephony terminal equipment 21 (see FIG. 2 and FIG. 3). As a result of this, it becomes possible to cause the control circuit 28b to notify the incoming call line to the incoming call line indicator 29, thereby causing the incoming call line indicator 29 to display the incoming call line. As such an incoming call line indicator 29 there can be considered, for example, an LED display portion or liquid crystal display portion, by means of which display is made of the incoming call line to thereby cause a user to identify this incoming call signal (reception signal).

Also, the control circuit 28b can be also set so that when an incoming call from the other line has been detected during telephone talk on one line, the control circuit 28b may notify the telephone talking user that there is an incoming call from the other line. In this case, the user dials the '#' or '*' button of, for example, a push button dial telephone 40. The control circuit 28b enables talking by the telephone 40 through this other line with the line on which the user has theretofore talked being kept on by this dialing operation.

The table for call line selection 28c is a memory section according to the present invention which stores the line selecting conditions of the call line selector 28 beforehand. In the table for call line selection 28c of this embodiment, as shown in Table 1, the data on signals for specifying the subscribers in the cable television network 30 or PSTN 31, e.g., data on dial number and the data on the cable telephony line 33 or PSTN line 34, which is connected according to the dial number, are stored in correspondence with each other.

Referring to the Table 1, the dial numbers "01xx-xx", "02xx-xx", "0463-69" and "07xx-xx" each indicate the area code and local area code of subscribers in the cable television network 30 or PSTN 32. The dial numbers "0463-21" and "0463-91" each indicate the area code and local area code of subscribers in the PSTN 31. The dial number "69" indicates the local area code of subscribers in the cable television network 30. The dial numbers "21" and "91" each indicate the local area code of subscribers in the PSTN 31. Also, the dial numbers "104", "109" and "110" each indicate the code in the 1xy system in the PSTN 31 where "x" indicates a given numeral.

It is to be noted that as another example of the data on a signal for specifying a subscriber as stored in the table for call line selection 28c there can be used data including, for example, a subscriber number along with the area code and local area code or data including an identification number of a CATV enterpriser that can be identified by the PSTN 31.

Meanwhile, referring to "Guide Line For Enterprising The Telephone Services Using CATV" that was issued from Ministry of Posts and Telecommunications on Nov. 18, 1994, there is a report which states that where adopting a number system common to that of a first-class telecommunication enterpriser 1 (e.g., NTT [Nippon Telegraph & Telephone Public Corporation]), there is used the same number as that of the first-class telecommunication enterpriser 1 with regard to the area code and there is used with regard to the local area code a number which is designated by Ministry of Postal Services as the number for identifying a CATV enterpriser. On this account, the present invention also is in accordance with this report.

In the table for call line selection 28c of this embodiment, as illustrated in FIG. 1, there is assumed a case where the cable telephony switch 11 installed in the CATV center 10 be connected to a first-class telecommunication enterpriser 2 of a switching system. On this account, in the table for call line selection 28c of this embodiment, if the number that has been dialed from the telephone 40 is a number of the CATV telephone within the same cable television network or a number in the case of a toll call, there is selected the cable telephony line of a cheaper charge. Also, if the dialed number is a number of a local call or a number of the 1xy system that starts with "1", there is selected the PSTN line. In this way, in the table for call line selection 28c, the dial numbers and the selection lines are made to correspond to each other.

TABLE 1

| DIAL NUMBER | LINE TO BE SELECTED |
|---|---|
| 01xx-xx | cable telephony line 33 |
| 02xx-xx | cable telephony line 33 |
| 0463-21 | PSTN line 34 |
| 0463-69 | cable telephony line 33 |
| 0463-91 | PSTN line 34 |
| 21 | PSTN line 34 |
| 69 | cable telephony line 33 |
| 91 | PSTN line 34 |
| 104 | PSTN line 34 |
| 109 | PSTN line 34 |
| 110 | PSTN line 34 |
| . | . |
| . | . |
| . | . |
| 07xx-xx | cable telephony line 33 |

The control circuit 28b stores the number which at the calling time has been dialed from the telephone 40 and, by using as an address the maximum 6 digits of this dialed number as counted from the highest order digit, selects a corresponding line from the table for call line selection 28c. It is to be noted that in this case of selection the control circuit 28b compares the dialed number from the telephone 40 and each dial number stored in the table for call line selection 28c, thereby specifying a dial number and thereby identifying a corresponding line to be selected. Accordingly, in the case of calling with respect to a local area subscriber, it is also possible to identify a line to which the telephone is to be connected upon input of only a first digit of the dial number at minimum.

Next, the control circuit 28b controls the changeover switch 28a to the selected line side, thereby connecting this selected line and the telephone 40 and transmitting the dial number to this selected line.

Here, in a case where the PSTN line 34 has been selected, the control circuit 28b switches the changeover switch 28a to a contact (b) side, thereby connecting the telephone 40 to the PSTN line 34 (see FIG. 3). As a result of this, the telephone 40 is connected to the PSTN 31 by way of the call line selector 28, thereby enabling the user to have a talk.

Also, in a case where the cable telephony line 33 has been selected, the control circuit 28b switches the changeover switch 28a to a contact (a) side, thereby connecting the telephone 40 to the cable telephony line 33 (see FIG. 3). Thereafter, the telephone signal is modulated to an RF signal by the cable telephony terminal modem 27 within the cable telephony terminal equipment 21 and the resulting signal is transmitted to the cable television network 30 via the splitter 26. This RF signal is transmitted to the cable telephony center equipment 12 via the head end 13 within the CATV center 10 and is converted there from the RF signal to a telephone signal. Also, the cable telephony switch 11 selects a transmission path according to an input telephone signal, whereby this cable telephony switch 11 is connected to inside the same cable television network or to the PSTN 32, with the result that it becomes possible for the user to have a talk.

As a result of this, in this embodiment, an incoming call (reception) signal from the cable telephony line or PSTN line is detected by the call line selector within the cable telephony terminal equipment. And, when detecting the incoming call signal, the call line selector connects the line from which the incoming call signal has come on and the telephone to thereby ring the bell. For this reason, in this embodiment, the two telephone systems, namely the CATV enterpriser and the first-class telecommunication enterpriser, commonly use the single telephone and this can eliminate the necessity of the user's selecting the telephone at the receiving time.

Further, in this embodiment, the table for call line selection is provided in the call line selector inside the cable telephony terminal equipment, thereby selecting the line via which the user has a telephone talk in correspondence with the dial number. Therefore, in this embodiment, at the calling time, the user need not select the line he uses by making his own judgement thereon and can automatically select an optimum line he uses by mere dialing. As a result of this, in this embodiment, it becomes possible to make the line selection in a short period of time and, even when there are many factors to be judged on that include the use charges and so judgement is complex, the line selection becomes possible by an accurate judgement.

Figure 4:
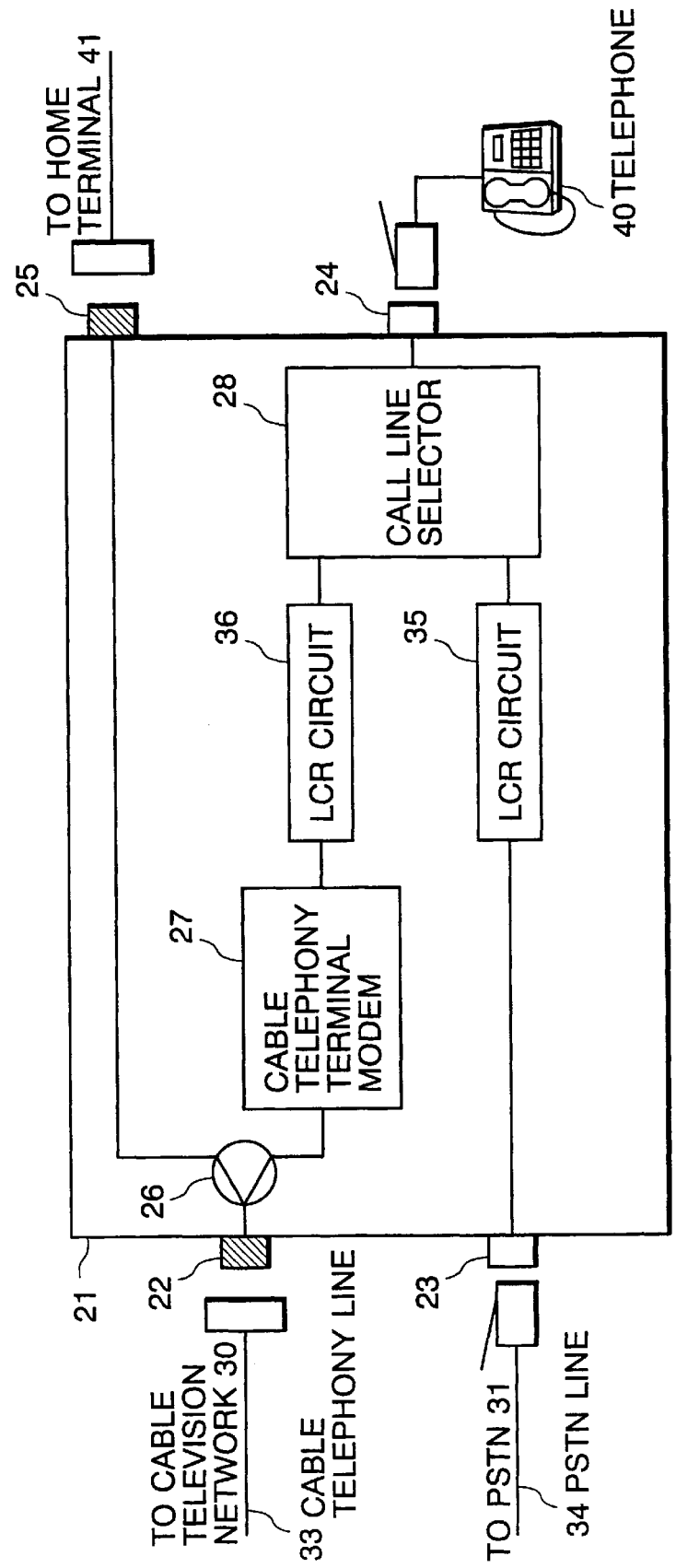
FIG. 4 is a block diagram illustrating a second embodiment of the construction of the cable telephony terminal equipment illustrated in FIG. 1.

FIG. 4 is a block diagram illustrating a second embodiment of the construction of the cable telephony terminal equipment illustrated in FIG. 1. It is to be noted that in the Figures referred to hereafter, the constituent portions the same as those in FIG. 2 are denoted by like reference symbols for convenience of explanation.

Referring to FIG. 4, the cable telephony terminal equipment 21 of this embodiment is made up into a construction prepared by adding LCR circuits 35 and 36 to the construction of FIG. 2. That is, the LCR circuit 35 is connected between a modular connector 23 and a call line selector 28. Also, the LCR circuit 36 is connected between a cable telephony terminal modem 27 and the call line selector 28.

The LCR circuits 35 and 36 are selecting means according to the present invention. Each of the LCR circuits 35 and 36 has, as shown in Table 2, a charge table in which the use charges for PSTNs 31 and 32 in charge of a plurality of first-class telecommunication enterprisers (e.g., the above-mentioned first-class telecommunication enterprisers 1 and 2) are respectively stored in correspondence with the dial numbers. In each of the LCR circuits 35 and 36, from the use charges for the PSTNs 31 and 32 in charge of the first-class telecommunication enterprisers 1 and 2 which correspond to the dial number input from the telephone 40, there is selected the PSTN whose use charge is lower. And, the data on the identification number of the first-class telecommunication enterpriser that corresponds to the selected PSTN 31 or 32 is added to the input dial number, and the resulting dial number signal is transmitted to the cable telephony line 33 or PSTN line 34.

TABLE 2

| Area Code | First-Class Tele-<br>communication<br>Enterpriser 1 | First-Class Tele-<br>communication<br>Enterpriser 2 |
|---|---|---|
| 01xx | 10 | 8 |
| 02xx | 30 | 24 |
| . | . | . |
| . | . | . |
| . | . | . |
| 07xx | 80 | 50 |

In the CATV center that is connected to the cable television network 30, upon receipt of this dial number signal, the cable telephony switch 11 makes the line selection of whether the telephone signal should be transmitted to the PSTN 32 or to the PSTN 31 and transmits the telephone signal to the PSTN corresponding to the selected line. It is to be noted that in the PSTN 31 also, the cable telephony switch inside the PSTN 31 similarly makes the line selection.

In this embodiment, the cable telephony terminal equipment is equipped with the LCR circuits each having a charge table for a plurality of the first-class telecommunication enterprisers and selects the PSTN in charge of the first-class telecommunication enterpriser that corresponds to a lower use charge from the use charges for the PSTNs that correspond to an input dial number, and adds the data on the identification number of this first-class telecommunication enterpriser to this input dial number. Therefore, in this embodiment, it becomes unnecessary to perform complex dial operations for adding the identification number of the enterpriser and it is possible to use, in the case of a toll call between a local area subscriber and a without-local area subscriber, the telecommunication line of a lower use charge selectively from the two telecommunication lines in charge of the first-class telecommunication enterpriser 1 and in charge of the first-class telecommunication enterpriser 2 that functions as a switching system. Therefore, in this embodiment, it is possible to decrease the user's telephone talk charge.

Incidentally, in this embodiment, the LCR circuits are connected to both the PSTN line and the cable telephony line, respectively. However, the present invention is not limited thereto and it is also possible to connect the LCR circuit with respect to only one line that enables effective decrease in the telephone talk charge.

Further, in this embodiment, it is also possible to set the arrangement so that each time the telephone talk charge is revised or periodically the contents of the charge table within the LCR circuit may be rewritten from the PSTN side or cable telephony line side. In this case, the user can use the telecommunication line at all times at low use charges.

Figure 5:
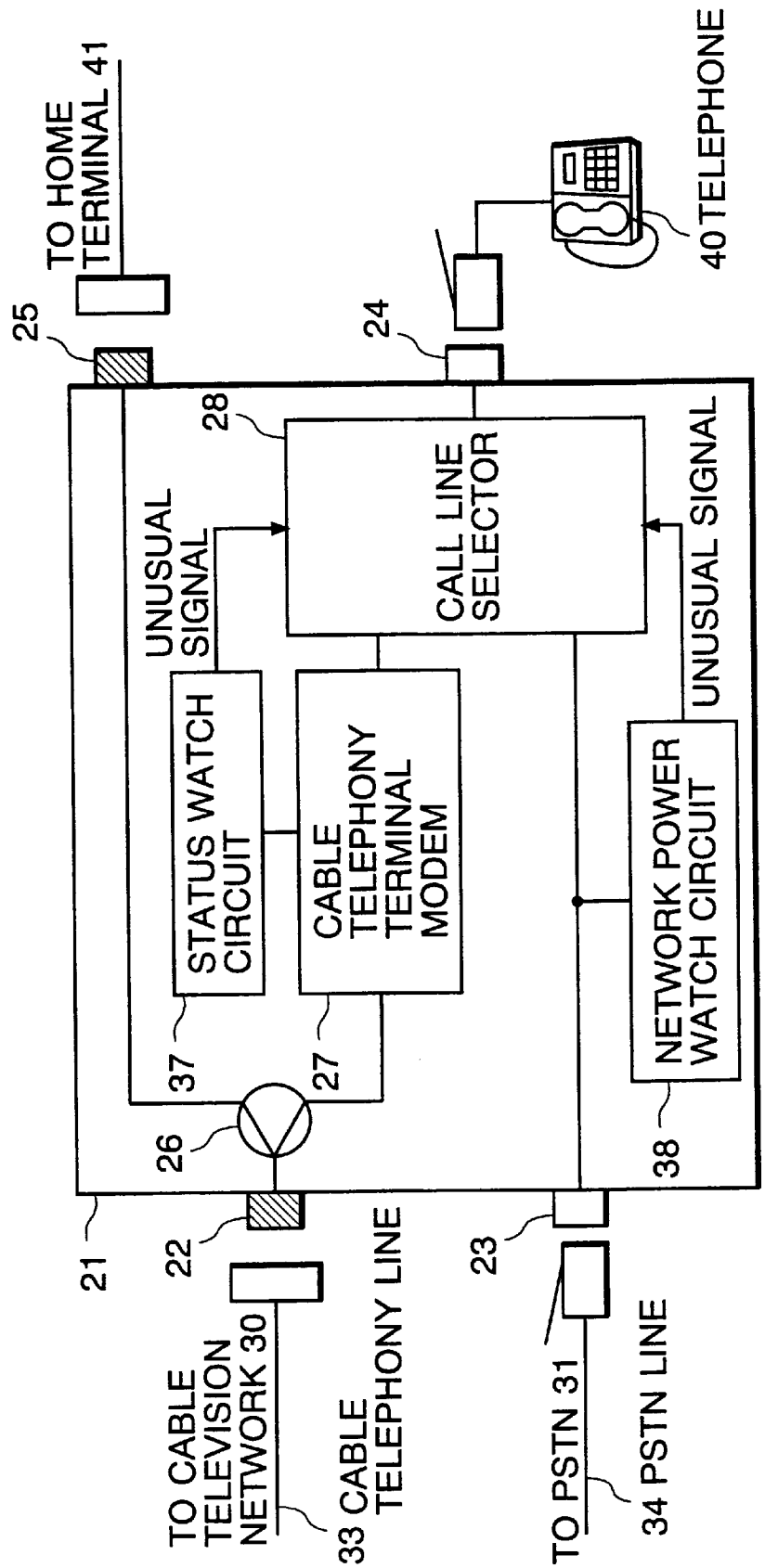
FIG. 5 is a block diagram illustrating a third embodiment of the construction thereof.

FIG. 5 is a block diagram illustrating a third embodiment of the construction of the cable telephony terminal equipment. Referring to FIG. 5, the cable telephony terminal equipment 21 of this embodiment is made up into a construction prepared by adding to the construction of FIG. 2 watch circuits 37 and 38 for watching the respective statuses of the telecommunication lines.

That is, the status watch circuit 37 is arranged to watch the status of the cable telephony terminal modem 27 (the status of whether or not the CATV telephone modem can be used). And, when the cable television network 30 has become unable to be used for some reason or other, the status signal changes (for example, this signal ceases to appear). Then, the status watch circuit 37 detects this change and sends an unusual signal to the control circuit 28b of the call line selector 28. Upon input of this unusual signal, the control circuit 28b switches the changeover switch 28a so as to cause a forced use of the PSTN line 34, thereby connecting the PSTN line 34 and the telephone 40.

Also, a network power watch circuit 38 is arranged to watch the power supply voltage for the PSTN line 34 (the voltage of the power for operating the telephone). And, when this power supply voltage differs from a preset usual value, the network power watch circuit 38 sends an unusual signal to the control circuit 28b of the call line selector 28. Upon input of this unusual signal, the control circuit 28b switches the changeover switch 28a so as to cause a forced use of the cable telephony line 33, thereby connecting the cable telephony line 33 and the telephone 40.

Also, when the line on which abnormality has occurred has been restored to the usual status, the watch circuits 37 and 38 stop outputting the unusual signal to notify the call line selector 28 of this restoration. In the call line selector 28, when detecting the stop of the unusual signal, a transfer is made from the above-mentioned forced switching control to a usual switching control.

Accordingly, in this embodiment, the statuses of the both lines are watched by the watch circuits and, when one of the lines has became unable to be used for some reason or other, switching of the one line is performed so as to cause a forced use of the other line. Therefore, in this embodiment, the telephone can be easily connected to the other line, with the result that the defective connection of the lines is prevented and so an optimum line selection can be automatically performed.

It is to be noted that in the present invention, it is also possible to use, in addition to the watching method of watching the status of the cable telephony terminal modem, another watching method of, for example, watching the presence or absence of various carrier wave signals of the cable television network. With the use of the cable telephony terminal equipment having such watching function, also, it is possible to duplex the telecommunication line in units of a home and, even when an abnormality occurs in one line, for the user to easily use the telephone without performing complex operations or line selections.

Figure 6:
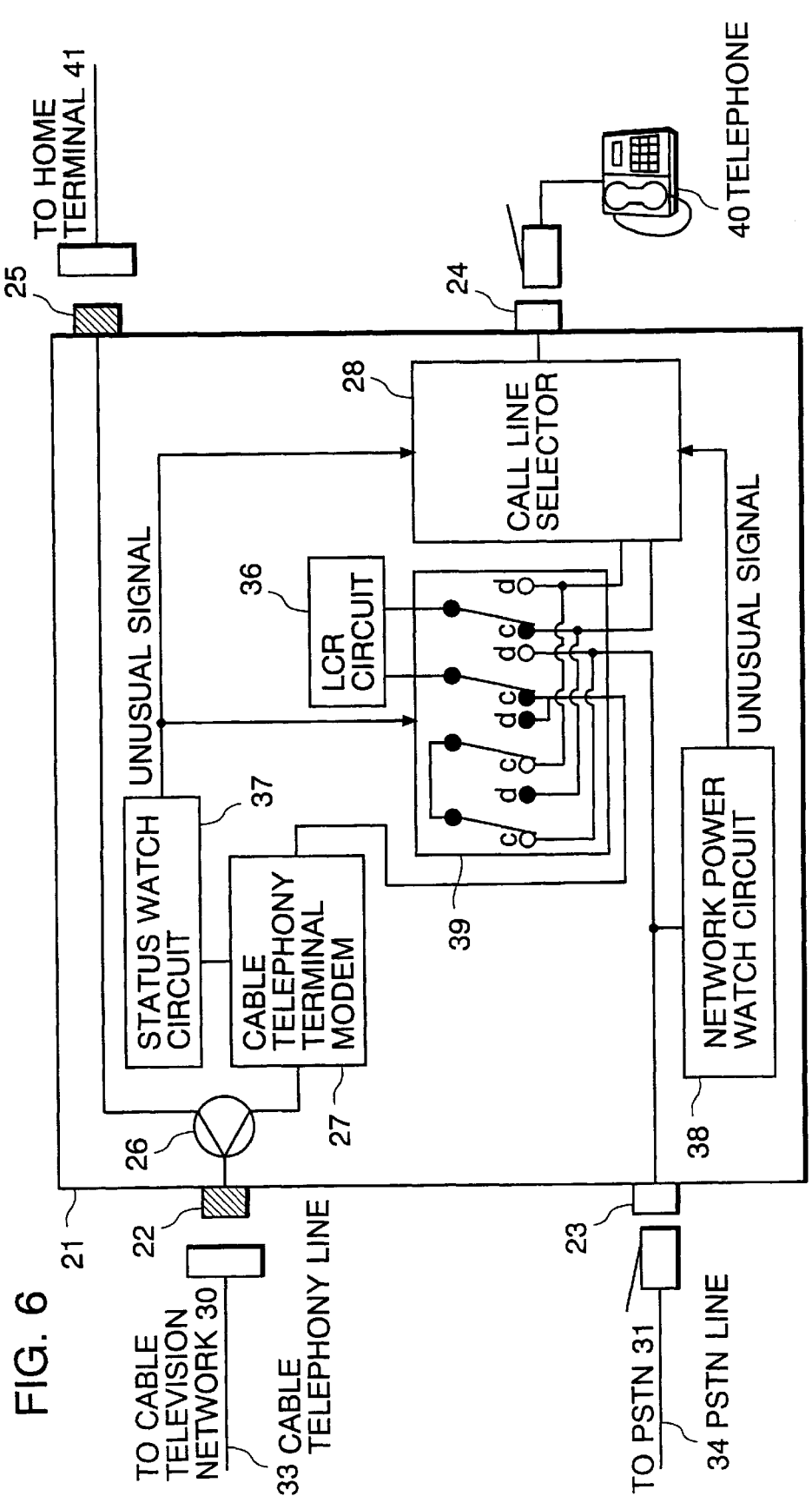
FIG. 6 is a block diagram illustrating a fourth embodiment of the construction thereof.

FIG. 6 is a block diagram illustrating a fourth embodiment of the construction of the cable telephony terminal equipment illustrated in FIG. 1. Referring to FIG. 6, the cable telephony terminal equipment 21 of this embodiment is made up into a construction prepared by adding an LCR circuit 36 and a changeover switch 39 to the construction of FIG. 5. The changeover switch 39 is intended to switch the line to which one LCR circuit 36 is connected and this switching is performed using a status watch circuit 37 for watching the status of the cable telephony terminal modem 27.

That is, usually, the LCR circuit 36 is connected to the cable telephony line 33 side by the changeover switch 39 (a contact (c) side in FIG. 6). In this case, when the cable telephony line 33 becomes unable to be used, the status watch circuit 37 sends an unusual signal to the call line selector 28 and the changeover switch 39.

Upon receipt of this unusual signal, the contact (c) of the changeover switch 39 is switched to a contact (d) side, thereby connecting the LCR circuit 36 to the PSTN line 34 side. It is to be noted that in this case the call line selector 28 connects the PSTN line 34 and the telephone 40.

As a result of this, since in this embodiment one LCR circuit is used by switching of its contacts, it becomes unnecessary to use a plurality of LCR circuits, thereby enabling reduction in the manufacturing cost. In addition, when the cable telephony line cannot be used, it is possible to use the PSTN line.

Further, in this embodiment, since there is usually also used the LCR circuit that is connected to the cable telephony line side, in the case of a toll call between a local area subscriber and a without-local area subscriber it becomes possible to select the line of a lower use charge and so it is possible to have a telephone talk through the use of a network with a lower use charge.

Incidentally, in the present invention, it is also possible, with the line to which the LCR circuit is usually connected being set to be the PSTN line, to set the arrangement so that when the PSTN line cannot be used this connection may be switched to the cable telephony line.

Further, it is also possible to make up the table for call line selection 28c of the call line selector 28 illustrated in FIG. 3 into tables composed of stored contents shown by way of example in Tables 3 and 4 respectively.

That is, in the case of this embodiment, the control circuit 28b has the table for call line selection that has the contents of the Table 3 in which the use charges for the cable telephony line 33 and PSTN line 34 are stored in correspondence with the dial numbers and the contents of the Table 4 in which the dial numbers of the 1XY system and the data on the PSTN line 34 connected correspondingly thereto are stored in correspondence with each other.

TABLE 3

| Dial Number | 1st-Class Telecommunication Enterpriser 1 | CATV |
| --- | --- | --- |
| 01xx-xx | 10 | 8 |
| 02xx-xx | 30 | 24 |
| 0463-21 | 10 | 20 |
| 0463-69 | 20 | 5 |
| 0463-91 | 10 | 20 |
| 21 | 10 | 20 |
| 69 | 20 | 5 |
| 91 | 10 | 20 |
| . | . | . |
| . | . | . |
| . | . | . |
| 07xx-xx | 80 | 50 |

TABLE 4

| Dial Number | Line To Be Selected |
| --- | --- |
| 104 | PSTN Line 34 |
| 109 | PSTN Line 34 |
| 110 | PSTN Line 34 |
| . | . |
| . | . |
| . | . |
| 119 | PSTN Line 34 |

In this embodiment, there is selected the line whose use charge is lower of the use charges for the lines that correspond to the dial number input from the telephone 40. And, in this embodiment, the changeover switch 28a is switched so as to connect this selected line and the telephone 40.

Also, upon input of the dial number of the 1XY system, the control circuit 28b selects the PSTN line 34 regardless of the charge system, whereby the changeover switch 28a is switched so as to connect the PSTN line 34 and the telephone 40.

Accordingly, in this embodiment, since there is used the table for call line selection that has the contents of the use charges for the lines corresponding to the dial numbers, at the calling time the control circuit can automatically select the line of a lower use charge by using the charge system as a selecting criterion.

Further, in this embodiment as well, it is also possible to set the arrangement so that each time the telephone talk charge is revised or periodically the contents of the table for call line selection within the control circuit 28b may be rewritten from the PSTN line side or cable telephony line side. In this case, the user can use the telecommunication line at all times at low use charges.

It is to be noted that the cable telephony terminal equipment (i.e., device) according to the present invention is not limited to that illustrated in each of the above-mentioned embodiments but permits the use thereof in various combinations.

What is claimed is:

1. A cable telephony terminal device comprising:
   a first connector connected to a line for a cable television network;
   a second connector connected to a line for a PSTN;
   an extracting unit which extracts telephone data of a prescribed frequency band from data that is communicated with the cable television network; and
   a call line selector connected to a telephone and connecting one of the first and the second connectors and the telephone according to a selecting signal input thereto from the telephone.

2. A cable telephony terminal device according to claim 1, further comprising:
   a distributing unit which distributes data items from the cable television network; and
   a third connector for outputting one of the distributed data items to another device.

3. A cable telephony terminal device according to claim 1, wherein:
   the selecting signal comprises a signal for specifying a subscriber within the cable television network or PSTN; and
   the call line selector comprises a memory portion in which there are stored data relating to the selecting signal and data relating to the cable television network or PSTN to be connected in correspondence therewith.

4. A cable telephony terminal device according to claim 1, wherein the call line selector comprises a detecting portion for detecting an incoming call signal from each of the respective networks and, in correspondence with an output of the detecting portion, connects a corresponding one of the first and the second connectors and the telephone.

5. A cable telephony terminal device according to claim 1, which further comprises:

a status watch circuit for watching a state of use of the line for each of the cable television network and PSTN, whereby the call line selector causes a forced connection of one of the first and the second connectors and the telephone in correspondence with an output of the status watch circuit.

6. A cable telephony terminal device according to claim 1, which further comprises:

a status watch circuit for watching a state of use of the line for each of the cable television network and PSTN; and selecting units for storing therein use charges for a plurality of communication line networks in correspondence with selecting signal data, and for selecting the communication line network whose use charge is lowest for the respective networks that correspond to the input selecting signal and adding to the input selecting signal identification number data of the selected communication line network, whereby the call line selector causes a forced connection of one of the first and the second connectors and the telephone according to an output of the status watching circuit to thereby send the selecting signal having the identification number added thereto to the one of the first and second connectors that has been connected to the telephone.

7. A cable telephony terminal device according to claim 1, wherein:

the selecting signal comprises a signal for specifying a subscriber within the cable television network or PSTN; and the call line selector comprises a memory portion for storing therein use charges for the cable television network and PSTN in correspondence with selecting signal data, whereby the network whose use charge is lowest for the respective networks that correspond to the input selecting signal is selected from the memory portion, thereby connecting one of the first and second connectors to the selected network and the telephone.

* * * * *